United States Patent [19]
Okawa

[11] Patent Number: 4,778,321
[45] Date of Patent: Oct. 18, 1988

[54] PANEL COUPLER

[76] Inventor: Toshiya Okawa, c/o Nifco Inc., 184-1 Maioka-cho, Totsuka-ku, Yokohama-shi, Kanagawa-ken, Japan

[21] Appl. No.: 912,328

[22] Filed: Sep. 26, 1986

[30] Foreign Application Priority Data

Sep. 30, 1985 [JP] Japan .............................. 60-148217[U]

[51] Int. Cl.[4] ...................... F16B 21/18; F16B 43/02
[52] U.S. Cl. .................................... 411/523; 411/533; 411/546; 411/901
[58] Field of Search ............... 411/174, 175, 339, 512, 411/522-524, 531, 533, 542, 544, 546, 547, 970, 369, 370, 901; 403/397, 408.1

[56] References Cited

U.S. PATENT DOCUMENTS

| 3,009,722 | 11/1961 | Augustin | 411/542 |
| 3,418,869 | 12/1968 | Herpich | 411/546 |
| 3,778,539 | 12/1973 | Baier | 411/542 |
| 4,074,491 | 2/1978 | Bell et al. | 411/970 |
| 4,286,642 | 9/1981 | Keatley | 411/112 |
| 4,472,861 | 9/1984 | Joseph et al. | 411/547 |

FOREIGN PATENT DOCUMENTS 2518195 6/1983 France .................. 403/408

Primary Examiner—Neill Wilson
Attorney, Agent, or Firm—Richard A. Giangiorgi

[57] ABSTRACT

A panel coupler for coupling together two facing panels at a predetermined distance from each other by passing a bolt through the panels and tightening a nut on the bolt comprises a panel clamp member having two facing planar portions coupled together by a U-shaped portion, the planar portions being provided with aligned holes through which the bolt is passed, and a cylindrical portion extending outwardly from the edge of the mounting hole of one of the planar portions, the outer periphery of the cylindrical portion being provided with a plurality of axial ribs, and a metal ring pressure fitted on the cylindrical portion.

1 Claim, 2 Drawing Sheets

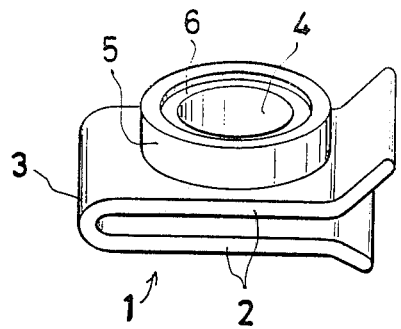
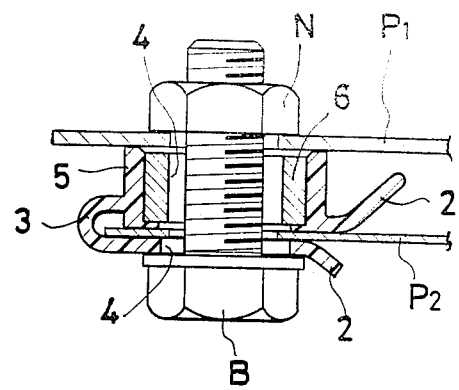
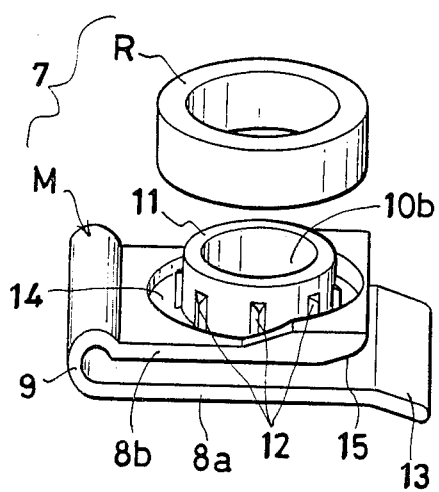
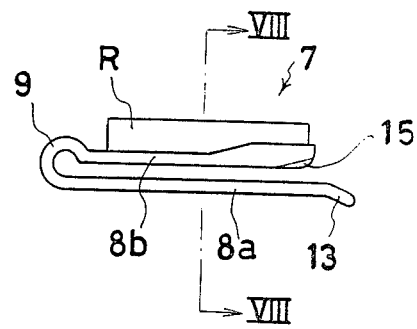
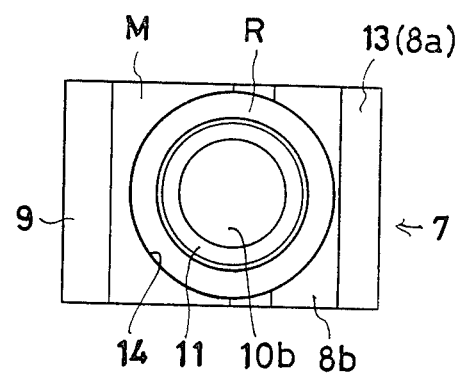

PANEL COUPLER

FIELD OF THE INVENTION AND RELATED ART STATEMENT

This invention relates to a panel coupler and, more particularly, to a panel coupler for coupling together two facing panels spaced apart a predetermined distance, by passing a bolt through the facing panels and tightening a nut on the bolt.

Heretofore, various panel couplers for coupling together two panels have been proposed. An example of this type of panel coupler is shown in FIGS. 1 and 2. The illustrated panel coupler 1 is produced by injection molding from a plastic material. It has two planar portions 2 facing each other and coupled together by a U-shaped portion 3. The two planar portions 2 have aligned mounting holes 4, through which a bolt B is passed. A cylindrical portion 5 extends outwardly from the edge of the mounting hole 4 of one planar portion 2. A reinforcement metal ring 6 is inserted in the cylindrical portion 5 when the panel coupler is molded.

With this prior art coupler 1, however, since the metal ring 6 is inserted during molding, the molding process is very time-consuming, leading to high molding cost. In addition, since the metal ring 6 is fitted in the cylindrical portion 5, resin is liable to enter the inside of the metal ring 6 from the open end thereof at the time of the molding. Besides, when a nut N is tightened on a bolt B, the metal ring 6 is liable to be rotated in unison with the bolt in the cylindrical portion 5. Reference symbols $P_1$ and $P_2$ in FIG. 2 designate panels to be joined together with a space left therebetween.

OBJECT AND SUMMARY OF THE INVENTION

An object of the invention is to provide a panel coupler, which can prevent rotation of a reinforcement metal ring with the bolt and can be very readily manufactured.

To attain the above object of the invention, there is provided a panel coupler for coupling together two panels at a predetermined distance from each other by passing a bolt through the facing panels and tightening a nut on the bolt, which comprises a panel clamp member having two planar portions facing each other and coupled together by a U-shaped portion, the planar portions being provided with aligned holes through which the bolt is passed, and a cylindrical portion extending outwardly from the edge of the mounting hole of the planar portions, the outer periphery of the cylindrical portion being provided with a plurality of axial ribs, and a metal ring pressure fitted on the cylindrical portion.

BRIEF DESCRIPTION OF THE DRAWINGS

The above and other objects and features of the invention will become more apparent from the following detailed description with reference to the accompanying drawings, in which:

FIG. 1 is a perspective view showing a prior art panel coupler;

FIG. 2 is a sectional view showing the panel coupler of FIG. 1 in use;

FIG. 3 is an exploded perspective view showing an embodiment of the panel coupler according to the invention;

FIG. 4 is an elevational view showing the panel coupler of FIG. 3;

FIG. 5 is a plan view showing the panel coupler of FIG. 3;

DETAILED DESCRIPTION OF THE PREFERRED EMBODIMENT

Figure 6:
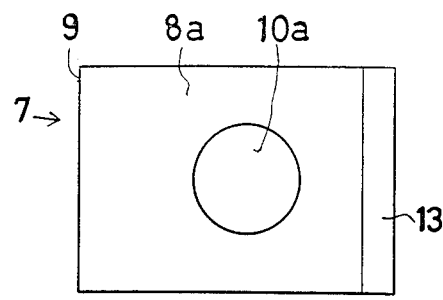
FIG. 6 is a bottom view showing the panel coupler of FIG. 3.
Figure 7:
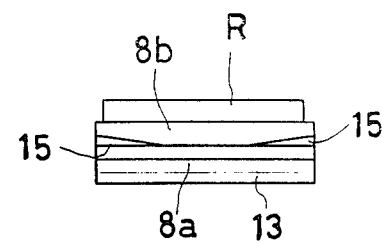
FIG. 7 is a right side view showing the panel coupler of FIG. 3.
Figure 8:
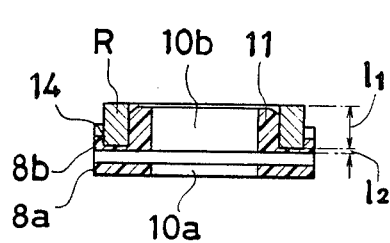
FIG. 8 is a sectional view taken along line VIII—VIII in FIG. 4.

FIGS. 3 to 9 illustrate an embodiment of the panel coupler according to the invention. In the embodiment of panel coupler 7, a reinforcement metal ring R is pressure fitted on a panel clamp member M which is a plastic molding.

The panel clamp member M has planar portions $8a$ and $8b$ facing each other and a U-shaped portion 9 coupling together the planar portions $8a$ and $8b$. The planar portions $8a$ and $8b$ have aligned mounting holes $10a$ and $10b$, through which a bolt B is passed. A cylindrical portion 11 extends upwards from the edge of the mounting hole $10b$ of the planar portion $8b$. A plurality of radially spaced-apart axial ribs 12 are provided on the outer periphery of the ylindrical portion 11.

The planar portions $8a$ and $8b$ are plate-like, and their stems are coupled together by the U-shaped portion 9 such that they face each other at a distance smaller than the thickness of the panel $P_2$ to be inserted. Of the two planar portions $8a$ and $8b$, the planar portion $8a$ is longer than the other planar portion $8b$. The longer planar portion $8a$ is downwardly bent at a free end portion 13. The other, i.e., shorter, planar portion $8b$ has the upwardly extending cylindrical portion 11. The outer periphery of the cylindrical portion 11 is provided with a plurality of radially spaced-apart axial ribs 12 having a triangular sectional profile. The planar portion $8b$ has a shallow annular groove 14 surrounding the stem of the cylindrical portion 11. The lower end portion of the metal ring R is fitted in the annular groove 14. The free end portion of the short planar portion $8b$ has upwardly inclined tapered surfaces 15 formed along the opposite sides.

The reinforcement metal ring R has an inner diameter which is slightly smaller than the outer diameter of the circumference of the ribs 12 of the cylindrical portion 11. The axial dimension (thickness) of the metal ring R is selected so that it slightly projects from the cylindrical porion 11 when it is fitted therein. Thus, after the panel clamp member M has been molded, the ring R is pressure fitted on the cylindrical portion 11, whereby the ring R is secured to the cylindrical portion 11.

Figure 9:
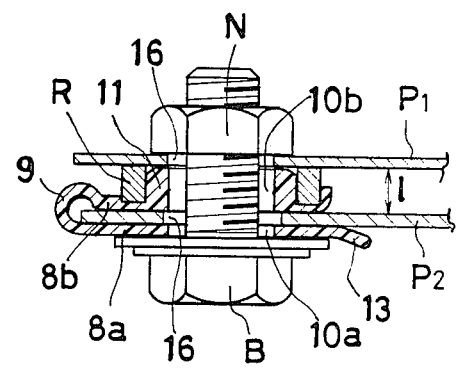
FIG. 9 is a sectional view showing the panel coupler of FIG. 3 in use.

Now, the way of use of the embodiment of the panel coupler will be described with reference to FIG. 9.

Two panels $P_1$ and $P_2$ are set such that their holes 16 face each other. Then, the gap between planar portions $8a$ and $8b$ is fitted on an end portion of the panel $P_1$ such that the hole 16 of the panel $P_1$ and mounting holes $10a$ and $10b$ of the planar portions $8a$ and $8b$ are aligned.

Since the gap between the planar portions $8a$ and $8b$ is set to be slightly smaller than the thickness of the panel $P_2$, it is increased when the planar portions $8a$ and $8b$ are fitted on the end portion of the panel $P_2$. Thus, the panel $P_2$ is clamped in the gap between the planar portions 8a and 8b by the elastic force of the U-shaped portion 9. In this way, the panel coupler 7 is secured to the panel P₂. In this state, the other panel P₁ is set such that the short planar portion 8b of the panel coupler 7 is sandwiched between the panels P₁ and P₂ and that the holes 16 of the panels P₁ and P₂ and mounting holes 10a and 10b of the planar portions 8a and 8b are aligned. Thereafter, a bolt B is passed through the aligned holes 16 and mounting holes 10a and 10b. A nut N is then tightened on the projecting end of the bolt B. Thus, the two panels P₁ and P₂ are coupled together via the panel coupler 7.

In this coupled state, the metal ring R and short planar portion 8b is clamped in the gap between the two panels P₁ and P₂, and the panels P₁ and P₂ are vertically spaced apart by a distance l equal to the sum of the axial dimension l₁ of the metal ring and the thickness l₂ of the portion of the short planar portion 8b under the annular groove.

As the mounting procedure, when the two panels P₁ and P₂ are held spaced apart a predetermined distance, the short planar portion 8b with the metal ring R may be inserted into the space between the two planar panels P₁ and P₂.

In the illustrated embodiment, the top of the metal ring R projects from the top of the cylindrical portion 11. Thus, when the top of the metal ring R is in contact with the panel surface, the cylindrical portion 11 is not compressed and deformed, whereby the two panels P₁ and P₂ are held horizontally when the nut N is tightened on the bolt B.

Further, since the planar portion 8b fitted in the gap between the two panels P₁ and P₂ is shorter than the planar portion 8a the panel can be readily inserted. Besides, with the bent end portion 13 of the long planar portion 8a and tapered surfaces 15 of the short planar portion 8b, the panel insertion opening is increased, thus further facilitating the insertion of the panel.

As has been described in the foregoing, according to the invention the outer periphery of the cylindrical portion 11 is provided with a plurality of axial ribs 12. Thus, the panel clamp member M and metal ring R can be easily and rigidly assembled by pressure fitting the metal ring R on the cylindrical portion 11. Further, since the metal ring R is fitted on the outer periphery of the cylindrical portion 11, it is not rotated in unison with the bolt B or nut N when the nut N is tightened on the bolt B.

What is claimed is:

1. A panel coupler for coupling together two facing panels at a predetermined distance from each other by passing a bolt through the panels and tightening a nut on the bolt, comprising a panel clamp member of plastic molded material having two facing planar portions coupled together by a U-shaped portion with the two facing planar portions spaced apart by a distance smaller than the thickness of a panel to be inserted between the planar portions, said planar portions being provided with aligned holes through which the bolt is to be passed, and a cylindrical portion extending outwardly from the edge of the mounting hole of one of said planar portions, the outer periphery of the cylindrical portion being provided with a plurality of axial ribs having an outer circumference, and a metal ring having an inner diameter slightly smaller than said outer circumference of said ribs, said ring being pressure fitted on said cylindrical portion over said ribs, said one of said planar portions being recessed about said cylindrical portion and providing a reduced thickness of material, the axial dimension of said metal ring being such that said metal ring bottoms against said reduced thickness of material and projects slightly from said cylindrical portion when said metal ring is assembled on said cylindrical portion.

* * * * *

UNITED STATES PATENT AND TRADEMARK OFFICE
CERTIFICATE OF CORRECTION

PATENT NO. : 4,778,321
DATED : October 18, 1988
INVENTOR(S) : Toshiya Okawa

It is certified that error appears in the above-identified patent and that said Letters Patent is hereby corrected as shown below:

On the title page Insert

--(73) Assignee: Nifco Inc., Yokohama, Japan--.

Signed and Sealed this

Fifteenth Day of August, 1989

Attest:

DONALD J. QUIGG

*Attesting Officer*      *Commissioner of Patents and Trademarks*